United States Patent
Joye

(10) Patent No.: US 10,601,578 B2
(45) Date of Patent: Mar. 24, 2020

(54) PROTECTING ECC AGAINST FAULT ATTACKS

(71) Applicant: NXP B.V., Eindhoven (NL)

(72) Inventor: Marc Joye, Palo Alto, CA (US)

(73) Assignee: NXP B.V., Eindhoven (NL)

( * ) Notice: Subject to any disclaimer, the term of this patent is extended or adjusted under 35 U.S.C. 154(b) by 92 days.

(21) Appl. No.: 15/795,103

(22) Filed: Oct. 26, 2017

(65) Prior Publication Data

US 2019/0132114 A1     May 2, 2019

(51) Int. Cl.
*H04L 29/06*     (2006.01)
*H04L 9/00*     (2006.01)
(Continued)

(52) U.S. Cl.
CPC ............. *H04L 9/004* (2013.01); *H04L 9/14* (2013.01); *H04L 9/302* (2013.01); *H04L 9/3066* (2013.01); *H04L 2209/26* (2013.01)

(58) Field of Classification Search
CPC ....... H04L 9/3066; H04L 9/014; H04L 9/004; H04L 9/302
(Continued)

(56) References Cited

U.S. PATENT DOCUMENTS

2002/0152252 A1* 10/2002 Kaminaga ............... G06F 7/722
                                                                                                 708/491
2008/0049931 A1* 2/2008 Vasyltsov ............... G06F 7/725
                                                                                                 380/28
(Continued)

OTHER PUBLICATIONS

Ebeid, Nevine, and Rob Lambert. "Securing the elliptic curve montgomery ladder against fault attacks." 2009 Workshop on Fault Diagnosis and Tolerance in Cryptography (FDTC). IEEE, 2009. (Year: 2009).*
(Continued)

*Primary Examiner* — Syed A Zaidi

(57) ABSTRACT

A method for protecting against faults in a computation of a point multiplication $Q=[k]P$ on an elliptic curve E defined over a prime field $\mathbb{F}_p$, including: defining an integer r and a group $\mathbb{G}'=\{\gamma(\vartheta)|\vartheta\in\mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$; forming a combined group $E(\mathbb{F}_p)\times\mathbb{G}'\cong E(\mathbb{F}_p)\times(\mathbb{Z}/r\mathbb{Z})^+$ which is isomorphic to a cross product of the groups $E(\mathbb{F}_p)$ and $(\mathbb{Z}/r\mathbb{Z})^+$; selecting an element $\vartheta$ in $\mathbb{Z}/r\mathbb{Z}$ and defining an element $P'=\gamma(\vartheta)$ in group $\mathbb{G}'$; forming a combined element $\hat{P}=CRT(P,P')$ in the group $E(\mathbb{F}_p)\times\mathbb{G}'$; calculating $\hat{Q}=[k]\hat{P}$ in the combined group $E(\mathbb{F}_p)\times\mathbb{G}'$; calculating $k\vartheta$ in $\mathbb{Z}/r\mathbb{Z}$; and checking whether $\hat{Q}\equiv Q'\pmod{r}$ where $Q'=\gamma(k\vartheta)$.

24 Claims, 1 Drawing Sheet

(51) Int. Cl.
*H04L 9/30* (2006.01)
*H04L 9/14* (2006.01)

(58) Field of Classification Search
USPC .......................................................... 380/28
See application file for complete search history.

(56) References Cited

U.S. PATENT DOCUMENTS

| | | | | |
|---|---|---|---|---|
| 2009/0034720 | A1* | 2/2009 | Baek | G06F 7/725 380/30 |
| 2009/0113252 | A1* | 4/2009 | Lambert | G06F 7/725 714/48 |
| 2010/0232599 | A1* | 9/2010 | Joye | G06F 7/725 380/28 |
| 2010/0232601 | A1* | 9/2010 | Itoh | G06F 7/725 380/28 |
| 2011/0246548 | A1* | 10/2011 | Yen | G06F 7/724 708/492 |
| 2016/0043863 | A1* | 2/2016 | Dupaquis | H04L 9/004 380/28 |

OTHER PUBLICATIONS

Page, Dan, and Frederik Vercauteren. "A fault attack on pairing-based cryptography." IEEE Transactions on Computers 55.9 (2006): 1075-1080 (Year: 2006).*
J. Blomer et al. Sign change fault attacks on elliptic curve cryptosystems; Fault Diagnosis and Tolerance in Cryptog. pp. 36-52.
M. Joye. Edwards curves and fault attacks. Presented at the rump session of CRYPTO 2012, Santa Barbara, USA, Aug. 21, 2012. Available at http://crypto.2012.rump.cr.yp.to/.
S. Neves et al. Degenerate curve attacks—extending invalid curve attacks to Edwards curves and other models. pp. 19-35.
Y.-J. Baek et al., How to prevent DPA and fault attacks in a unified way for ECC scalar multiplication-Ring Extension Method, pp. 225-236.
Joye, On the Security of a Unified Countermeasure, Fault Diagnosis and Tolerance in Cryptography (FDTC 2008) pp. 87-91. IEEE Press, 2008.
Antipa et al: "Validation of Elliptic Curve Public Keys", in Y.Desmedt, editor, PKC 2003, vol. 2567 of LNCS, pp. 211-223. Springer, Heidelberg, Jan. 2003.
Bar-El et al: "The Sorcerer's Apprentice Guide to Fault Attacks", Proceedings of the IEEE, vol. 94, Issue: 2, 370-382, Feb. 2006.
Bernstein et al: "Twisted Edwards Curves", in S. Vaudenay, editor, AFRICACRYPT 08, vol. 5023 of LNCS, pp. 389-405. Springer, Heidelberg, Jun. 2008.
Bernstein et al.: "Twisted Hessian Curves", in K. E. Lauter and F. Rodriguez-Henriquez, editors, LATINCRYPT 2015, vol. 9230 of LNCS, pp. 269-294. Springer, Heidelberg, Aug. 2015.
Bernstein et al: "Faster Addition and Doubling on Elliptic Curves", in K. Kurosawa, editor, ASIACRYPT 2007, vol. 4833 of LNCS, pp. 29-50. Springer, Heidelberg, Dec. 2007.
Biehl et al: "Differential Fault Attacks on Elliptic Curve Cryptosystems", in M. Bellare, editor, CRYPTO 2000, vol. 1880 of LNCS, pp. 131-146. Springer, Heidelberg, Aug. 2000.
Billet et al: "The Jacobi Model of an Elliptic Curve and Side-Channel Analysis", in M. Fossorier, T. Hoholdt, and A. Poli, editors, Applied Algebra, Algebraic Algorithms and Error-Correcting Codes, vol. 2643 of LNCS, pp. 34-42. Springer, Heidelberg, 2003.
Blake et al: "Elliptic Curves in Cryptography", No. 265 in London Mathematical Society Lecture Note Series, Cambridge University Press, 1999.
Boneh et al: "On the Importance of Eliminating Errors in Cryptographic Computations", Journal of Cryptology, 14(2):101-119, 2001.
Bosma et al: "Complete Systems of Two Addition Laws for Elliptic Curves", Journal of Number Theory, 53(2):229-240, 1995.

Chudnovsky et al: "Sequences of Numbers Generated by Addition in Formal Groups and New Primality and Factorization Tests", Adv. Appl. Math., 7:385-434, 1986.
Ciet et al: "Elliptic Curve Cryptosystems in the Presence of Permanent and Transient Faults", Designs, Codes and Cryptography, 36(1):33-43, 2005.
Ciss et al: "On a New Generalization of Huff Curves", Cryptology ePrint Archive, Report 2011/580, 2011. http://eprint.iacr.org/2011/580.
Duquesne: "Improving the Arithmetic of Elliptic Curves in the Jacobi Model", Information Processing Letters, 104(3):101-105, 2007.
Edwards: "A Normal Form for Elliptic Curves", Bull. Am. Math. Soc., 44(3):393-422, 2007.
Farashahi et al: "Efficient Arithmetic on Hessian Curves", In P. Q. Nguyen and D. Pointcheval, editors, PKC 2010, vol. 6056 of LNCS, pp. 243-260. Springer, Heidelberg, May 2010.
Giraud et al: "A Survey on Fault Attacks", in J.-J. Quisquater et al., editors, Smart Card Research and Advanced Applications VI (CARDIS 2004), pp. 159-176. Kluwer, 2004.
Hesse: "Uber die Elimination der Variabeln aus drei algebraischen Gleichungen vom zweiten Grade mit zwei Variabeln", J. Reine Angew. Math., 10:68-96, 1844.
Hisil et al: "New Formulae for Efficient Elliptic Curve Arithmetic", in K. Srinathan, C. P. Rangan, and M. Yung, editors, INDOCRYPT 2007, vol. 4859 of LNCS, pp. 138-151. Springer, Heidelberg, Dec. 2007.
Hisil et al: "Twisted Edwards Curves Revisited", in J. Pieprzyk, editor, ASIACRYPT 2008, vol. 5350 of LNCS, pp. 326-343. Springer, Heidelberg, Dec. 2008.
Hisil et al: "Jacobi Quartic Curves Revisited", in C. Boyd and J. M. G. Nieto, editors, ACISP 09, vol. 5594 of LNCS, pp. 452-468. Springer, Heidelberg, Jul. 2009.
Hisil, Huseyin et al.; "An Exploration of Affine Group Laws for Elliptic Curves;" Journal of Mathematical Cryptology; vol. 5, Issue 1; pp. 1-50 (2011); DOI: 10.1515/jmc.2011.005.
Huff, Gerald B. "Diophantine Problems in Geometry and Elliptic Ternary Forms;" Duke Math J., vol. 15, No. 2 (1948) pp. 443-453; DOI:10.1215/S0012-7094-48-01543-9.
Joye, Marc et al.; "Secure Evaluation of Modular Functions;" In R. Hwang and C. Wu, editors, 2001 International Workshop on Cryptology and Network Security, pp. 227-229, Taipei, Taiwan, Sep. 2001.
Joye, Marc et al.; "Hessian Elliptic Curves and Side-Channel Attacks;" Cryptographic Hardware and Embedded Systems—CHES 2001, Lecture Notes in Computer Science, vol. 2162, Springer, Berlin, Heidelberg.
Joye, Marc et al.; "Huff's Model for Elliptic Curves;" International Algorithmic Number Theory Symposium ; ANTS 2010, vol. 6197 of Lecture Notes in Computer Science; pp. 234-250, Jul. 2010 Nancy, France.
Joye, Marc et al.; "Fault Analysis in Cryptography;" Information Security and Cryptography. Springer, 2012.
Karabina, Koray et al.; "Invalid-Curve Attacks on (Hyper)Elliptic Curve Cryptosystems;" Advances in Mathematics of Communications; vol. 4, No. 3, pp. 307-321; 2010.
Kim, Taechan et al.; "Bit-Flip Faults on Elliptic Curve Base Fields;" Applied Cryptography and Network Security, 12th International Conference; Lausanne, Switzerland; Jun. 10-13, 2014.
Lange, H. et al.; "Complete Systems of Addition Laws on Abelian Varieties;" Inventiones Mathematicae; vol. 79, Issue 3; pp. 603-610; Oct. 1985 (retrieved from The Goettingen State and University Library.
Lange, H. et al.; "Addition Laws on Elliptic Curves in Arbitrary Characteristics;" Journal of Algebra, vol. 107, Issue 1; pp. 106-116; Apr. 1987.
Liardet, P.-Y. et al.; "Preventing SPA/DPA in ECC Systems Using the Jacobi Form;" International Workshop on Cryptographic Hardware and Embedded Systems; Cryptographic Hardware and Embedded Systems—CHES 2001; Lecture Notes in Computer Science, vol. 2162. Springer, Berlin, Heidelberg.
Orhon, Neriman Gamze et al.; "Speeding up Huff Form of Elliptic Curves;" Cryptology ePrint Archive, Report 2017/320, 2017. http://eprint.iacr.org/2017/320.

(56) References Cited

OTHER PUBLICATIONS

Renes, Joost et al; "Complete Addition Formulas for Prime Order Elliptic Curves;" IACR-EUROCRYPT, May 2016.
Rivest, R. L. et al.; "A Method for Obtaining Digital Signatures and Public-Key Cryptosystems;" Communications of the ACM, vol. 21, Issue 2; pp. 120-126; Feb. 1978; DOI: doi>10.1145/359340. 359342.
Rubin, Karl et al.; "Torus-Based Cryptography;" Conference: Advances in Cryptology—CRYPTO 2003, 23rd Annual International Cryptology Conference, Santa Barbara, California; Aug. 17-21, 2003.
Schmidt, Jorn-Marc et al.; "A Fault Attack on ECDSA," 2009 Workshop on Fault Diagnosis and Tolerance in Cryptography (FDTC), IEEE; Date of Conference Sep. 2009; DOI: 10.1109/FDTC. 2009.38.
Shamir, Adi; "How to Check Modular Exponentiation;" Presented at the rump session of EUROCRYPT' 97, Konstanz, Germany, May 13, 1997.
Silverman, J. H.; "The Arithmetic of Elliptic Curves;" No. 106 in GTM. Springer-Verlag, 1986.
Smart, N.P.; "The Hessian Form of an Elliptic Curve;" International Workshop on Cryptographic Hardware and Embedded Systems; CHES 2001, vol. 2162, pp. 118-125; Springer, Heidelberg, May 2001.
Wu, Hongfeng et al.;"Elliptic Curves in Huff's Model;" Wuhan University Journal of Natural Sciences, vol. 17, Issue 6, pp. 473-480; Dec. 2012.
Yen, Sung-Ming et al.; "RSA Speedup with Chinese Remainder Theorem Immune Against Hardware Fault Cryptanalysis;" IEEE Transactions on Computers, vol. 52, issue 4, Apr. 2003; DOI: 10.1109/TC.2003.1190587.
Joye, Marc; "Elliptic Curve Cryptosystems in the Presence of Faults;" 2013 Workshop on Fault Diagnosis and Tolerance in Cryptography; p. 73; Aug. 20, 2013, Santa Barbara, California; DOI: 10.1109/FDTC.2013.10.
Dugardin, Margaux et al.; "Using Modular Extension to Provably Protect Edwards Curves Against Fault Attacks;" International Association for Cryptologic Research; vol. 20160814:122545, pp. 1-18; Aug. 14, 2016.

\* cited by examiner

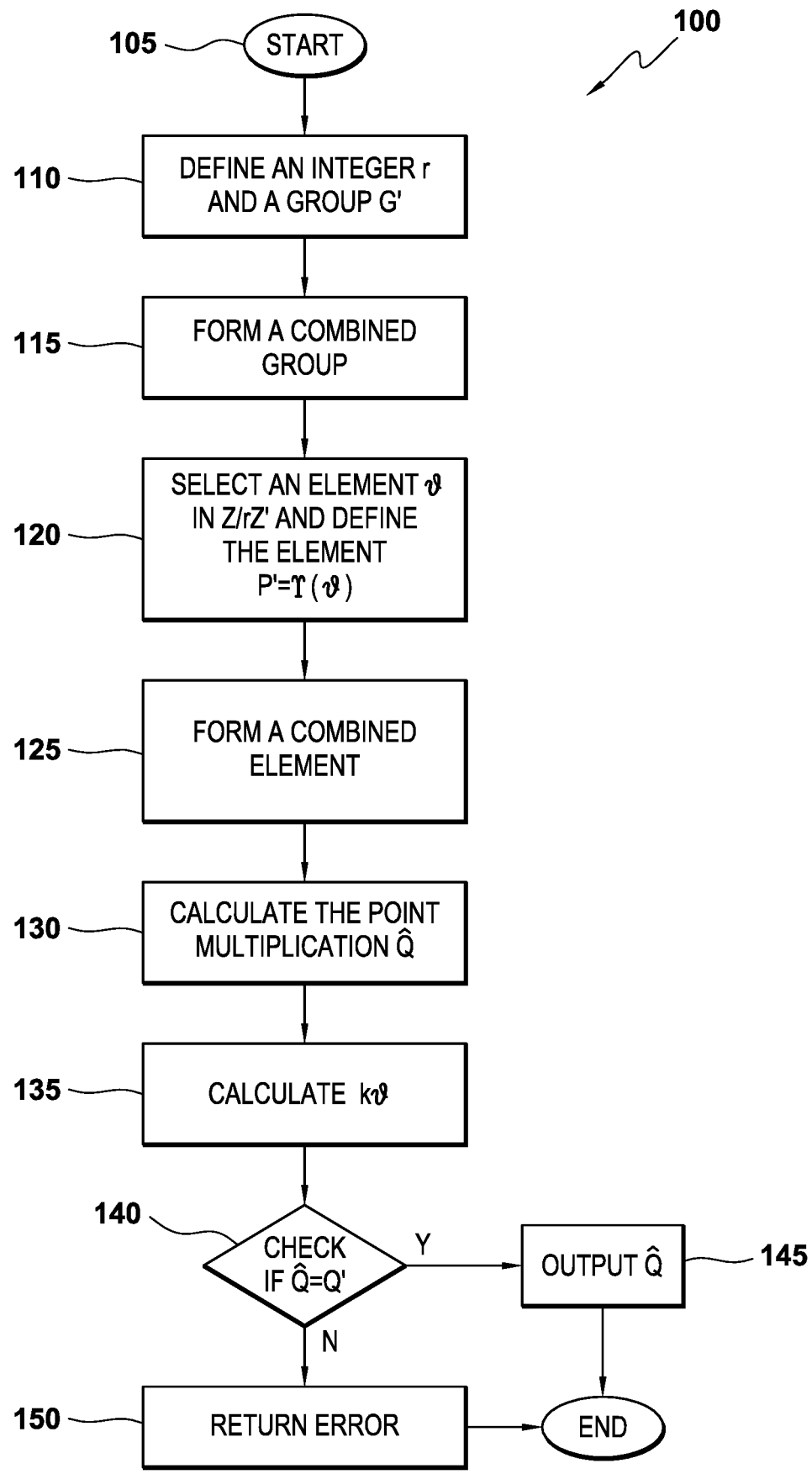

PROTECTING ECC AGAINST FAULT ATTACKS

TECHNICAL FIELD

Various exemplary embodiments disclosed herein relate generally to protecting elliptic curve cryptography (ECC) implementations against fault attacks.

BACKGROUND

Techniques such as Blomer-Otto-Seifert (BOS) method have been developed for combating fault attacks in ECC systems. The BOS system does add significant additional processing to ECC systems though.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for protecting against faults in a computation of a point multiplication $Q=[k]P$ on an elliptic curve E defined over a prime field $\mathbb{F}_p$, including: defining an integer r and a group $\mathbb{G}'=\{\gamma(\vartheta)|\vartheta \in \mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$; forming a combined group $E(\mathbb{F}_p) \times \mathbb{G}' \mathbb{F} E(\mathbb{F}_p) \times (\mathbb{F}/r\mathbb{F})^+$ which is isomorphic to a cross product of the groups $E(\mathbb{F}_p)$ and $(\mathbb{Z}/r\mathbb{Z})^+$; selecting an element $\vartheta$ in $\mathbb{Z}/r\mathbb{Z}$ and defining an element $P'=\gamma(\vartheta)$ in group $\mathbb{G}'$; forming a combined element $\hat{P}=CRT(P,P')$ in the group $E(\mathbb{F}_p) \times \mathbb{G}'$; calculating $\hat{Q}=[k]\hat{P}$ in the combined group $E(\mathbb{F}_p) \times \mathbb{G}'$; calculating $k\vartheta$ in $\mathbb{Z}/r\mathbb{Z}$; and checking whether $\hat{Q} \equiv Q' \pmod{r}$ where $Q'=\gamma(k\vartheta)$.

Further various embodiments relate to a non-transitory machine-readable storage medium encoded with instructions for protecting against faults in a computation of a point multiplication $Q=[k]P$ on an elliptic curve E defined over a prime field $\mathbb{F}_p$, including: instructions for defining an integer r and a group $\mathbb{G}'=\{\gamma(\vartheta)|\vartheta \in \mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism instructions for forming a combined group $E(\mathbb{F}_p) \times \mathbb{G}' \cong E(\mathbb{F}_p) \times (\mathbb{Z}/r\mathbb{Z})^+$ which is isomorphic to a cross product of the groups $E(\mathbb{F}_p)$ and $(\mathbb{Z} r\mathbb{Z})^+$; instructions for selecting an element $\vartheta$ in $\mathbb{Z}/r\mathbb{Z}$ and defining an element $P'=\gamma(\vartheta)$ in group $\mathbb{G}'$; instructions for forming a combined element $\hat{P}=CRT(P,P')$ in the group $E(\mathbb{F}_p) \times \mathbb{G}'$; instructions for calculating $\hat{Q}=[k]\hat{P}$ in the combined group $E(\mathbb{F}_p) \times \mathbb{G}'$; instructions for calculating $k\vartheta$ in $\mathbb{Z}/r\mathbb{Z}$; and instructions for checking whether $\hat{Q} \equiv Q' \pmod{r}$ where $Q'=\gamma(k\vartheta)$.

Further various embodiments relate to device for protecting against faults in a computation of a point multiplication $Q=[k]P$ on an elliptic curve E defined over a prime field $\mathbb{F}_p$, including: a memory; and a processor in communication with the memory, the processor configured to: define an integer r and a group $\mathbb{G}'=\{\gamma(\vartheta)|\vartheta \in \mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$; form a combined group $E(\mathbb{F}_p) \times \mathbb{G}' \cong E(\mathbb{F}_p) \times (\mathbb{Z}/r\mathbb{Z})^+$ which is isomorphic to a cross product of the groups $E(\mathbb{F}_p)$ and $(\mathbb{Z}/r\mathbb{Z})^+$; select an element $\vartheta$ in $\mathbb{Z}/r\mathbb{Z}$ and defining an element $P'=\gamma(\vartheta)$ in group $\mathbb{G}'$; form a combined element $\hat{P}=CRT(P,P')$ in the group $E(\mathbb{G}_p) \times \mathbb{G}'$; calculate $\hat{Q}=[k]\hat{P}$ in the combined group $E(\mathbb{F}_p) \times \mathbb{G}'$; calculate $k\vartheta$ in $\mathbb{Z}/r\mathbb{Z}$; and check whether $\hat{Q} \equiv Q' \pmod{r}$ where $Q'=\gamma(k\vartheta)$.

Various embodiments are described, wherein when $\hat{Q} \equiv Q' \pmod{r}$ output $Q=\hat{Q} \bmod p$ and otherwise return an error.

Various embodiments are described, wherein $\mathbb{G}'$ is a set of points $(\vartheta,1)$ on a twisted Edwards curve.

Various embodiments are described, wherein $\mathbb{G}'$ is a set of points $(\vartheta,1)$ on a Jacobi quartic curve.

Various embodiments are described, wherein $\mathbb{G}'$ is a set of points $(\vartheta,1,1)$ on a Jacobi quadratics intersection curve.

Various embodiments are described, wherein $\mathbb{G}'$ is a set of points $(\vartheta,-1)$ on a Hessian curve.

Various embodiments are described, wherein $\mathbb{G}'$ is a set of points $(\vartheta, \bar{c}\vartheta)$ on a Huff curve, where $\bar{c}$ is any value in $\mathbb{Z}/r\mathbb{Z}$.

Various embodiments are described, wherein $\mathbb{G}'$ is a set of points $(\vartheta:1:\vartheta^3)$ on a Weierstrass curve.

BRIEF DESCRIPTION OF THE DRAWINGS

In order to better understand various exemplary embodiments, reference is made to the accompanying drawings, wherein:

FIG. 1 illustrates a method for protecting against faults in the computation of a point multiplication $Q=[k]P$ on an elliptic curve E defined over the prime field $\mathbb{F}_p$.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Elliptic curve cryptography (ECC) is an interesting alternative to Rivest-Shamir-Adleman (RSA) cryptography because the keys are much shorter for a same conjectured security level. Given a point P on an elliptic curve E and an integer k, the basic operation includes computing the scalar multiplication $[k]P$, that is, $P \oplus P \oplus \ldots \oplus P$ (k times) where $\oplus$ denotes the group operation on E. The goal of an attacker is to recover the value of k (or a part thereof) by inducing faults.

For RSA cryptographic systems, Shamir's countermeasure was developed. Shamir's countermeasure generalizes to elliptic curve scalar multiplication and is known as the Blömer-Otto-Seifert (BOS) countermeasure. The BOS countermeasure method is as follows.

Suppose one has to compute Q=[k]P on an elliptic curve E defined over the prime field $\mathbb{F}_p$ and given by the Weierstraß equation $y^2=x^3+ax+b$.

1. For a (small) prime r, define an elliptic curve E' over $\mathbb{F}_r$ and a point P' on E';
2. Form the combined curve Ê=CRT(E,E') over $\mathbb{Z}/rp\mathbb{Z}$ and the combined point P̂=CRT(P,P') (where CRT is the Chinese remainder theorem; whose application is defined below);
3. Compute Q̂=[k]P̂ on Ê;
4. Compute Q'=[k]P' on E';
5. Check whether Q̂≡Q' (mod r), and
   if so, output Q=Q̂ mod p;
   if not, return error.

The following observations of the BOS countermeasure method are noted. If $y^2=x^3+a'x+b'$ is the equation defining the elliptic curve E' over $\mathbb{F}_r$, CRT(E,E') denotes the elliptic curve over $\mathbb{Z}/rp\mathbb{Z}$ given by the equation $y^2=x^3+âx+b̂$ where â=CRT(a(mod p), a'(mod r)) and b̂=CRT(b(mod p), b'(mod r)); i.e., such that â≡a(mod p) and â≡a'(mod r), and the same for b̂. Point P̂ is defined similarly from the coordinates of points P and P'.

In a concrete implementation, prime r, curve E' and point P' are precomputed so that the order of point P' on E', $ord_{E'}(P')$, is maximal. The value of n:=$ord_{E'}(P')$ together with r, the curve parameters, and point P' may be stored in non-volatile memory. This presents the further advantage in that the calculation of Q' in Step 4 of the BOS countermeasure method may be performed more efficiently as Q'=[k mod n]P'.

In order to avoid a single point of failure, infective computation is preferred to implement the final test of Step 5 of the BOS countermeasure method. For example, for Step 5, one could perform the following steps instead:

5.1. compute $c_x=(x(\hat{Q})+1-x(\hat{Q}')) \bmod r$ and $c_y=(y(\hat{Q})+1-y(Q')) \bmod r$, where $x(\hat{Q})$ and $y(\hat{Q})$ respectively denote the x- and y-coordinate of point Q̂ and similarly for point Q';

5.2. Choose a K-bit random integer ρ and compute $$\gamma = \left\lfloor \frac{\rho c_x + (2^K - \rho)c_y}{2^K} \right\rfloor;$$

and 5.3. return Q=[γ]R on E where R=Q̂ (mod p).

It can be checked that when Q̂≡Q'(mod r), $c_x$ and $c_y$ are both equal to 1, which leads to γ=1. Otherwise, γ is a random value and the returned point Q is a random point.

As discussed above, the BOS fault countermeasure method requires the prior generation and storage of a prime r, an elliptic curve E' over $\mathbb{F}_r$, and a point P' on E' of large order. For better performance, the order n of P' should also be pre-stored.

Another countermeasure is presented in Y.-J. Baek and I. Vasyltsov, "How to prevent DPA and fault attacks in a unified way for ECC scalar multiplication: Ring extension method," in E. Dawson and D. Wong, editors, *Information Security Practice and Experience—ISPEC* 2007, volume 4464 of *LNCS*, pages 225-237. Springer, Heidelberg, 2006. Compared to J. Blömer, M. Otto, and J.-P. Seifert, "Sign change fault attacks on elliptic curve cryptosystems, in L. Breveglieri et al., editors, *Fault Diagnosis and Tolerance in Cryptography—FDTC* 2006, volume 4236 of *LNCS*, pages 36-52. Springer, Heidelberg, 2006, Baek-Vasyltsov does not require precomputed values and does not assume that the randomizer r is a prime integer. Numerical experiments conducted in M. Joye, "On the security of a unified countermeasure," in L. Breveglieri et al., editors, *5th Workshop on Fault Diagnosis and Tolerance in Cryptography (FDTC* 2008), pages 87-91. IEEE Computer Society, 2008, however show that a non-negligible proportion of faults is undetected and that larger bit-lengths for r should be used.

More effective countermeasures are given in M. Joye, "Edwards curves and fault attack," presented at the rump session of CRYPTO 2012, Santa Barbara, USA, Aug. 21, 2012, available at http://crypto.2012rump.cr.yp.to/ and S. Neves and M. Tibouchi, "Degenerate curve attacks—extending invalid curve attacks to Edwards curves and other models, in C.-M. Cheng, K.-M. Chung, G. Persiano, and B.-Y. Yang, editors, *PKC* 2016, Part II, volume 9615 of *LNCS*, pages 19-35, Springer, Heidelberg, March 2016. They essentially follow the same approach. The idea is to rely on a shortcut for the evaluation of Q'=[k]P' on E' by an appropriate choice for E'. In Joye, E' is chosen as the subgroup of points on an elliptic curve over $\mathbb{Z}/r^2\mathbb{Z}$ that reduce to 0 modulo r. In Neves-Tibouchi, E' is chosen as the group of points on a degenerate curve over $\mathbb{F}_r$.

The method in Joye presents the disadvantage that fault attacks whose detection probability depends on the order of point P' implies a twice longer value for r. Indeed, the subgroup of points considered in Joye for E' has order r whereas the corresponding curve is defined modulo $r^2$. In turn, the combined curve Ê is defined over $\mathbb{Z}/r^2p\mathbb{Z}$, which is more demanding for the evaluation of Q̂ on Ê.

The combined curve in Neves-Tibouchi is defined over $\mathbb{Z}/rp\mathbb{Z}$ where r is prime. However, most elliptic curve models (the Weierstraß model is a notable exception) do not have an additive degeneration: they either degenerate to the (r−1)-order multiplicative group $\mathbb{F}_r^*$ or to the (r+1)-order multiplicative subgroup $T_2(\mathbb{F}_r)$ of elements of norm 1 in $\mathbb{F}_{r^2}^*$—it is noted that unlike Joye, Neves-Tibouchi assumes that r is prime. The multiplicative degeneration has two drawbacks. First, the shortcut function translates into an exponentiation modulo r (degeneration to $\mathbb{F}_r^*$) or into the evaluation of Lucas sequences modulo r (degeneration to $T_2(\mathbb{F}_r)$). Second, whereas it is easy to obtain a generator of the additive group $(\mathbb{Z}/r\mathbb{Z})^+$, for $\mathbb{F}_r^*$ and $T_2(\mathbb{F}_r)$, the respective factorization of r−1 or of r+1 is required. An easy fix is to increase the size of r so as to increase the probability that the order of P' as an element of the degenerate curve E' is large. The limitation on r being a (large) prime incurs computational complexity as r needs to be tested for primality.

Embodiments for more efficiently implementing a countermeasure method against faults for ECC versus the BOS countermeasure method will now be described. As aforementioned, obtaining a generator of the additive group $(\mathbb{Z}/r\mathbb{Z})^+$ is fairly easy: any non-zero integer co-prime to r generates $(\mathbb{Z}/r\mathbb{Z})^+$. Two possible strategies are:

1. Take 1 as a generator or fix a prime g larger that the maximum value for r. Then $(\mathbb{Z}/r\mathbb{Z})^+ = \langle 1 \rangle$ or $(\mathbb{Z}/r\mathbb{Z})^+ = \langle g \rangle$.
2. Select r as a prime number. Then any non-zero integer 0<g<r is a generator of $(\mathbb{Z}/r\mathbb{Z})^+$.

The idea of the embodiment is to replace the combined curve Ê in the BOS countermeasure by the group $$E(\mathbb{F}_p) \times \mathbb{G} \cong E(\mathbb{F}_p) \times (\mathbb{Z}/r\mathbb{Z})^+$$

which is isomorphic to the cross product of the groups $E(\mathbb{F}_p)$ and $(\mathbb{Z}/r\mathbb{Z})^+$ and where the group $\mathbb{G}'$ is represented with elements having a group law that coincides (i.e., is compatible) with the group law used in the representation for $E(\mathbb{F}_p)$. Such a representation for $\mathbb{G}'=\{P'=\gamma(\vartheta)|\vartheta\in\mathbb{Z}/r\mathbb{Z}\}$ where $$\Upsilon:(\mathbb{Z}/r\mathbb{Z})^+ \xrightarrow{\sim} \mathbb{G}', \begin{cases} 0 \mapsto \Upsilon(0) = 0 \\ \vartheta \mapsto \Upsilon(\vartheta) = P' \end{cases}$$

can easily be identified from the group law in E. This is illustrated in the next paragraphs with several elliptic curve models commonly used for cryptographic applications.

Because $\mathbb{G}'$ is selected such that $\gamma(\vartheta_1)\oplus\gamma(\vartheta_2)=\gamma(\vartheta_1+\vartheta_2)$, this means that $k\gamma(\vartheta)=\gamma(k\vartheta)=kP'$. This means that instead of calculating $kP'$ as a series of point additions on an elliptic curve as in the BOS method, the verification for the presence of faults can be performed from the calculation of $k\vartheta$. Because calculating $k\vartheta$ is a simple arithmetic multiplication modulo integer r, it is a much more efficient calculation versus the point multiplication in the BOS method. Accordingly, Step 4 of the BOS method may be replaced by a much more efficient operation.

This method is fully generic and can readily be adapted to any elliptic curve model and corresponding addition formulas. Also, although focusing on protecting elliptic curve computations over prime fields for the sake of concreteness, this method can be generalized to elliptic curve computations over arbitrary rings, including over binary fields.

FIG. 1 illustrates a method for protecting against faults in the computation of a point multiplication $Q=[k]P$ on an elliptic curve E defined over the prime field $\mathbb{F}_p$. The method 100 starts 105, and then defines an integer r and a group $\mathbb{G}'=\{\gamma(\vartheta)|\vartheta\in\mathbb{Z}/r\mathbb{Z}\}$ 110 represented with elements having a group law that coincides with the group law used in the representation for $E(\mathbb{F}_p)$ and isomorphic to the additive group $(\mathbb{Z}/r\mathbb{Z})^+$ through isomorphism $\gamma$. Next, the method 100 forms the combined group $E(\mathbb{F}_p)\times\mathbb{G}'\cong E(\mathbb{F}_p)\times(\mathbb{Z}/r\mathbb{Z})^+$ 115 which is isomorphic to the cross product of the groups $E(\mathbb{F}_p)$ and $(\mathbb{Z}/r\mathbb{Z})^+$ 115. Then the method 100 selects an element $\vartheta$ in $\mathbb{Z}/r\mathbb{Z}'$ and defines the element $P'=\gamma(\vartheta)$ in group $\mathbb{G}'$ 120. Next, the method 100 forms the combined element $\hat{P}=CRT(P,P')$ in the group $E(\mathbb{F}_p)\times\mathbb{G}'$ 125. The method 100 then calculates $\hat{Q}=[k]\hat{P}$ in the combined group $E(\mathbb{F}_p)\times\mathbb{G}'$ 130. Next, the method 100, calculates $k\vartheta$ in $\mathbb{Z}/r\mathbb{Z}$ 135. The method then checks whether $\hat{Q}\equiv Q'(\text{mod } r)$ where $Q'=\gamma(k\vartheta)$ 140, and if so, output $Q=\hat{Q}$ mod p 145, and if not, return an error 150. The method then ends at 155.

Application of the above method will now be described for various elliptic curves that are used as the basis for ECC.

One elliptic curve to consider is a normal form for elliptic curves in a twisted form that is referred to as the twisted Edwards form. The twisted Edwards form, is given by the equation:

$$E_{\in_{a,d}}:ax^2+y^2=1+dx^2y^2. \quad (1)$$

The neutral element for this curve is $O=(0,1)$. The addition law is unified. Given two points $(x_1,y_1)$ and $(x_2,y_2)$, their sum $(x_3,y_3)=(x_1,y_1)\oplus(x_2,y_2)$ is given by:

$$(x_3, y_3) = \left(\frac{x_1y_2 + x_2y_1}{1 + dx_1x_2y_1y_2}, \frac{y_1y_2 - ax_1x_2}{1 - dx_1x_2y_1y_2}\right).$$

Applying the general method above to the twisted Edwards form results in:

$$(\mathbb{Z}/r\mathbb{Z})^+\xrightarrow{\mathbb{F}}\mathbb{G}'=\{\gamma(\mathbb{G})=(\vartheta,1)|\vartheta\in\mathbb{Z}/r\mathbb{Z}\}\subset\{(x,y)\in E_{\in_{0,0}}(\mathbb{Z}/r\mathbb{Z})\}.$$

In more detail, the group $(\mathbb{Z}/r\mathbb{Z})^+$ is viewed as the set $\mathbb{G}'$ of points $(x,1)$ on an Edwards curve (1) with parameters $a=d=0$, over the ring $\mathbb{Z}/r\mathbb{Z}$, equipped with the above addition law. When $a=d=0$, it is easily verified that:

$$\Upsilon(0) = (0, 1) = O, \text{ and}$$

$$\Upsilon(\vartheta_1)\oplus\Upsilon(\vartheta_2) =$$

$$(\vartheta_1, 1)\oplus(\vartheta_2, 1) = \left(\frac{\vartheta_1\cdot 1 + \vartheta_2\cdot 1}{1}, \frac{1\cdot 1}{1}\right) = (\vartheta_1+\vartheta_2, 1) = \Upsilon(\vartheta_1+\vartheta_2)$$

as desired.

Another elliptic curve to consider is the Jacobi quartic model. The (extended) Jacobi quartic model assumes an element of order 2. Its equation is given by:

$$E_{J_{a,d}}:y^2=dx^4+2ax^2+1 \quad (2)$$

with $O=(0,1)$ as the neutral element. The unified addition of two points $(x_1,y_1)$ and $(x_2,y_2)$, $(x_3,y_3)=(x_1,y_1)\oplus(x_2,y_2)$, is given by:

$$(x_3, y_3) = \left(\frac{x_1y_2 + x_2y_1}{1 - dx_1^2x_2^2}, \frac{(1+dx_1^2x_2^2)(y_1y_2+2ax_1x_2)+2dx_1x_2(x_1^2+x_2^2)}{(1-dx_1^2x_2^2)^2}\right).$$

The original Jacobi quartics correspond to the case $d=k^2$ and $-2a=1+k^2$ for some k.

Applying the general method above using the Jacobi quartic model results in:

$$(\mathbb{Z}/r\mathbb{Z})^+\cong\mathbb{G}'=\{\gamma(\vartheta)=(\vartheta\in\mathbb{Z},r\vartheta\}\subset\{(x,y)\in E_{J_{0,0}}(\mathbb{Z}/r\mathbb{Z})\}.$$

As it was for the Edwards model, it is readily verified for the Jacobi quartic model that $\gamma(0)=(0,1)=O$ and, when $a=d=0$, that $$\Upsilon(\vartheta_1)\oplus\Upsilon(\vartheta_2) =$$

$$(\vartheta_1, 1)\oplus(\vartheta_2, 1) = \left(\frac{\vartheta_1\cdot 1 + \vartheta_2\cdot 1}{1}, \frac{1\cdot 1}{1^2}\right) = (\vartheta_1+\vartheta_2, 1) = \Upsilon(\vartheta_1+\vartheta_2)$$

as desired.

Another elliptic curve to consider is the Jacobi quadratics intersection model which represents an elliptic curve as the intersection of two quadrics in $\mathbb{F}^3$. The most general form is as follows:

$$E_{Q_{a,b}}:\begin{cases}ax^2+y^2=1 \\ bx^2+z^2=1\end{cases}. \quad (3)$$

The neutral element is $O=(0,1,1)$. The unified sum of two points $(x_1,y_1,z_1)$ and $(x_2,y_2,z_2)$ is given by $(x_3,y_3,z_3)=(x_1,y_1,z_1)\oplus(x_2,y_2,z_2)$ where:

$$(x_3, y_3, z_3) = \left(\frac{x_1y_2z_2 + x_2y_1z_1}{1-abx_1^2x_2^2}, \frac{y_1y_2-ax_1z_1x_2z_2}{1-abx_1^2x_2^2}, \frac{z_1z_2-bx_1y_1x_2y_2}{1-abx_1^2x_2^2}\right).$$

Applying the general method above using the Jacobi quadrics intersection model results in:

$$(\mathbb{Z}/r\mathbb{Z})^+ \cong \mathbb{G}' = \{\gamma(\vartheta) = (\vartheta,1,1) | \vartheta \in \mathbb{Z}/r\mathbb{Z}\} \subset \{(x,y,z) \in E_{Q_{0,0}}(\mathbb{Z}/r\mathbb{Z})\}.$$

A simple calculation shows that $\gamma(0)=(0,1,1)=O$ and, when a=b=0, that $$\Upsilon(\vartheta_1) \oplus \Upsilon(\vartheta_2) = (\vartheta_1, 1, 1) \oplus (\vartheta_2, 1, 1) =$$
$$\left(\frac{\vartheta_1 \cdot 1 \cdot 1 + \vartheta_2 \cdot 1 \cdot 1}{1}, \frac{1 \cdot 1}{1}, \frac{1 \cdot 1}{1}\right) = (\vartheta_1 + \vartheta_2, 1, 1) = \Upsilon(\vartheta_1 + \vartheta_2)$$

as desired.

Another elliptic curve to consider are the Hessian curves. Hessian curves have been generalized, modified, and extended for cryptographic applications. Using for the neutral element the point O=(0,1), the curve equation is:

$$E_{\mathcal{H}_{a,d}}: ax^3 + y^3 + 1 = dxy. \tag{4}$$

The unified sum $(x_3, y_3) = y_1 \oplus (x_2, y_2)$ of two affine points $(x_1, y_1)$ and $(x_2, y_2)$ is given by:

$$(x_3, y_3) = \left(\frac{x_1 - y_1^2 x_2 y_2}{ax_1 y_1 x_2^2 - y_2}, \frac{y_1 y_2^2 - ax_1^2 x_2}{ax_1 y_1 x_2^2 - y_2}\right).$$

Applying the general method above using the Hessian curve above results in:

$$(\mathbb{Z}/r\mathbb{Z})^+ \cong \mathbb{G}' = \{\Upsilon(\vartheta) = (\vartheta, -1) | \vartheta \in \mathbb{Z}/r\mathbb{Z}\} \subseteq \{(x,y) \in E_{\mathcal{H}_{0,0}}(\mathbb{Z}/r\mathbb{Z})\}.$$

Again, it can be verified that $\gamma(0)=(0,-1)=O$ and that the addition law when a=d=0 yields $$\Upsilon(\vartheta_1) \oplus \Upsilon(\vartheta_2) = (\vartheta_1, -1) \oplus (\vartheta_2, -1) =$$
$$\left(\frac{\vartheta_1 - (-1)^2 \vartheta_2 (-1)}{-(-1)}, \frac{(-1)(-1)^2}{-(-1)}\right) = (\vartheta_1 + \vartheta_2, -1) = \Upsilon(\vartheta_1 + \vartheta_2)$$

as desired.

Another elliptic curve to consider are the Huff curves. The most general form is given by the equation:

$$E_{H_{a,c,d}}: y(ax^2+1) = cx(dy^2+1) \tag{5}$$

with neutral element O=(0,0). The unified addition formula of affine points $(x_1, y_1)$ and $(x_2, y_2)$ is given by $(x_3, y_3) = y_1 \oplus (x_2, y_2)$ where:

$$(x_3, y_3) = \left(\frac{(x_1 + x_2)(1 - dy_1 y_2)}{(1 - ax_1 x_2)(1 + dy_1 y_2)}, \frac{(y_1 + y_2)(1 - ax_1 x_2)}{(1 + ay_1 y_2)(1 - dx_1 x_2)}\right)$$

Applying the general method above using the Huff curve above and by fixing $\bar{c} \in \mathbb{Z}/r\mathbb{Z}$. results in:

$$(\mathbb{Z}/r\mathbb{Z})^+ \mathbb{F} \mathbb{G}' = \{\gamma(\vartheta) = (\vartheta, \bar{c} \cdot \vartheta) | \vartheta \in \mathbb{Z}/r\mathbb{Z}\} = \{(x,y) \in E_{H_{0,\bar{c},0}}(\mathbb{Z}/r\mathbb{Z})\}.$$

The correctness is verified by observing that $\gamma(0)=(0,0)=0$ and, when $(a,c,d)=(0,\bar{c},0)$, the addition law leads to $\gamma(\vartheta_1) \oplus \gamma(\vartheta_2) = (\vartheta_1, \bar{c} \cdot \vartheta_1) \oplus (\vartheta_2, \bar{c} \cdot \vartheta_2) = (\vartheta_1 + \vartheta_2, \bar{c} \cdot \vartheta_1 + \bar{c} \cdot \vartheta_2) = \gamma(\vartheta_1 + \vartheta_2)$ as desired.

The Weierstrass model is the most common way to represent an elliptic curve. It is given by the equation:

$$E_{W_{a,b}}: y^2 = x^3 + ax + b, \tag{6}$$

or using projective coordinates it is given as:

$$E_{W_{a,b}}: Y^2 Z = X^3 aXZ^2 + bZ^3. \tag{7}$$

The neutral element is the point at infinity O=(0:1:0). Unified addition formulas are given by $$\begin{cases} X_3 = (Y_1 Z_2 + Y_2 Z_1)[a(aZ_1 Z_2 - X_1 X_2) - 3b(X_1 Z_2 + X_2 Z_1)] + \\ \quad (X_1 Y_2 + X_2 Y_1)[Y_1 Y_2 - a(X_1 Z_2 + X_2 Z_1) - 3bZ_1 Z_2] \\ Y_3 = (X_1 Z_2 + X_2 Z_1)[3b(3X_1 X_2 - aZ_1 Z_2) - a^2(X_1 Z_2 + X_2 Z_1)] + \\ \quad (Y_1 Y_2 + 3bZ_1 Z_2)(Y_1 Y_2 - 3bZ_1 Z_2) - a[(aZ_1 Z_2 + 3X_1 X_2)(aZ_1 Z_2 - X_2 X_2)] \\ Z_3 = (X_1 Y_2 + X_2 Y_1)(aZ_1 Z_2 + 3X_1 X_2) + \\ \quad (Y_1 Z_2 + Y_2 Z_1)[Y_1 Y_2 + 3bZ_1 Z_2 + a(X_1 Z_2 + X_2 Z_1)] \end{cases}.$$

Applying the general method above using the Hessian curve above results in:

$$(\mathbb{Z}/r\mathbb{Z})^+ \mathbb{F} \mathbb{G}' = \{\gamma(\vartheta) = (\vartheta:1:\vartheta^3) | \vartheta \in \mathbb{Z}/r\mathbb{Z}\} \subset \{(X:Y:Z) \in E_{W_{0,0}}(\mathbb{Z}/r\mathbb{Z})\}.$$

Here again, it can be verified that $\gamma(0)=(0:1:0)=O$ and, when a=b=0, that the above addition formulas yield $\gamma(\vartheta_1) \oplus \gamma(\vartheta_2) = (\vartheta_1:1:\vartheta_1^3) \oplus (\vartheta_2:1:\vartheta_2^3) = (\vartheta_1 + \vartheta_2:1:(\vartheta_1 + \vartheta_2)3\vartheta_1\vartheta_2 + \vartheta_1^3 + \vartheta_2^3) = (\vartheta_1 + \vartheta_2:1:(\vartheta_1 + \vartheta_2)^3) = \gamma(\vartheta_1 + \vartheta_2)$ as desired.

The above embodiments list unified addition formulas; that is, the formulas remain valid when the input points are equal (point doubling). Depending on certain conditions (e.g., field characteristic or curve parameters), the formulas are even complete; that is, they can be used without any exception. It is worth noting that in all the previous embodiments the addition formulas are complete in $\mathbb{G}'$. The identity $\gamma(\vartheta_1) \oplus \gamma(\vartheta_2) = \gamma(\vartheta_1 + \vartheta_2)$ is always verified. This implies that randomizer r can be used freely in the proposed method; in particular, it is not required to be prime.

The methods described above may be implemented in software which includes instructions for execution by a processor stored on a non-transitory machine-readable storage medium. The processor may include a memory that stores the instructions for execution by the processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for protecting against faults in a computation of a point multiplication $Q=[k]P$ on an elliptic curve E defined over a prime field $\mathbb{F}_p$ for an elliptic curve cryptographic function in a cryptographic system, comprising:
receiving, by the cryptographic system, input data;
performing, by the cryptographic system, the elliptic curve cryptographic function on the input data wherein the cryptographic function is one of encryption, decryption, digital signatures, secure key exchange, and generation of public certificates and the elliptic curve cryptographic function includes the computation of the point multiplication $Q=[k]P$ on the elliptic curve E, the point multiplication further comprising:
defining an integer r and a group $\mathbb{G}'=\{\gamma(\vartheta)|\vartheta\in\mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$;
forming a combined group $E(\mathbb{F}_p)\times\mathbb{G}'\cong E(\mathbb{F}_p)\times(\mathbb{Z}/r\mathbb{Z})^+$ which is isomorphic to a cross product of the groups $E(\mathbb{F}_p)$ and $(\mathbb{Z}/r\mathbb{Z})^+$;
selecting an element $\vartheta$ in $\mathbb{Z}/r\mathbb{Z}$ and defining an element $P'=\gamma(\vartheta)$ in group $\mathbb{G}'$;
forming a combined element $\hat{P}=CRT(P,P')$ in the group $E(\mathbb{F}_p)\times\mathbb{G}'$;
calculating $\hat{Q}=[k]\hat{P}$ in the combined group $E(\mathbb{F}_p)\times\mathbb{G}'$;
calculating $k\vartheta$ in $\mathbb{Z}/r\mathbb{Z}$; and
checking whether $\hat{Q}\equiv Q'(\text{mod } r)$ where $Q'=\gamma(k\vartheta)$ to indicate a fault in a point multiplication in the cryptographic function in the cryptographic system; and
producing, by the cryptographic system, an output of the elliptic curve cryptographic function when no fault in the point multiplication is indicated.

2. The method of claim 1, wherein when $\hat{Q}\equiv Q'(\text{mod } r)$ output $Q=\hat{Q}$ mod p and otherwise return an error.

3. The method of claim 1, wherein $\mathbb{G}'$ is a set of points $(\vartheta,1)$ on a twisted Edwards curve.

4. The method of claim 1, wherein $\mathbb{G}'$ is a set of points $(\vartheta,1)$ on a Jacobi quartic curve.

5. The method of claim 1, wherein $\mathbb{G}'$ is a set of points $(\vartheta,1,1)$ on a Jacobi quadratics intersection curve.

6. The method of claim 1, wherein $\mathbb{G}'$ is a set of points $(\vartheta,-1)$ on a Hessian curve.

7. The method of claim 1, wherein $\mathbb{G}'$ is a set of points $(\vartheta,\bar{c}\vartheta)$ on a Huff curve, where $\bar{c}$ is any value in $\mathbb{Z}/r\mathbb{Z}$.

8. The method of claim 1, wherein $\mathbb{G}'$ is a set of points $(\vartheta:1:\vartheta^3)$ on a Weierstrass curve.

9. A non-transitory machine-readable storage medium encoded with instructions for protecting against faults in a computation of a point multiplication $Q=[k]P$ on an elliptic curve E defined over a prime field $\mathbb{F}_p$ for an elliptic curve cryptographic function in a cryptographic system, comprising:
instructions for receiving input data;
instructions for performing the elliptic curve cryptographic function on the input data wherein the cryptographic function is one of encryption, decryption, digital signatures, secure key exchange, and generation of public certificates and the elliptic curve cryptographic function includes the computation of the point multiplication $Q=[k]P$ on the elliptic curve E, the point multiplication further comprising:
instructions for defining an integer r and a group $\mathbb{G}'=\{\gamma(\vartheta)\vartheta\in\mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$;
instructions for forming a combined group $E(\mathbb{F}_p)\times\mathbb{G}'\cong E(\mathbb{F}_p)\times(\mathbb{Z}/r\mathbb{Z})^+$ which is isomorphic to a cross product of the groups $E(\mathbb{F}_p)$ and $(\mathbb{Z}/r\mathbb{Z})^+$;
instructions for selecting an element $\vartheta$ in $\mathbb{Z}/r\mathbb{Z}$ and defining an element $P'=\gamma(\vartheta)$ in group $\mathbb{G}'$;
instructions for forming a combined element $\hat{P}=CRT(P,P')$ in the group $E(\mathbb{F}_p)\times\mathbb{G}'$;
instructions for calculating $\hat{Q}=[k]\hat{P}$ in the combined group $E(\mathbb{F}_p)\times\mathbb{G}'$;
instructions for calculating $k\vartheta$ in $\mathbb{Z}/r\mathbb{Z}$; and
instructions for checking whether $\hat{Q}\equiv Q'(\text{mod } r)$ where $Q'=\gamma(k\vartheta)$ to indicate a fault in a point multiplication in the cryptographic system; and
instructions for producing an output of the elliptic curve cryptographic function when no fault in the point multiplication is indicated.

10. The non-transitory machine-readable storage medium of claim 9, wherein when $\hat{Q}\equiv Q'(\text{mod } r)$ output $Q=\hat{Q}$ mod p and otherwise return an error.

11. The non-transitory machine-readable storage medium of claim 9, wherein $\mathbb{G}'$ is a set of points $(\vartheta,1)$ on a twisted Edwards curve.

12. The non-transitory machine-readable storage medium of claim 9, wherein $\mathbb{G}'$ is a set of points $(\vartheta,1)$ on a Jacobi quartic curve.

13. The non-transitory machine-readable storage medium of claim 9, wherein $\mathbb{G}'$ is a set of points $(\vartheta,1,1)$ on a Jacobi quadratics intersection curve.

14. The non-transitory machine-readable storage medium of claim 9, wherein $\mathbb{G}'$ is a set of points $(\vartheta,-1)$ on a Hessian curve.

15. The non-transitory machine-readable storage medium of claim 9, wherein $\mathbb{G}'$ is a set of points $(\vartheta,\bar{c}\vartheta)$ on a Huff curve, where $\bar{c}$ is any value in $\mathbb{Z}/r\mathbb{Z}$.

16. The non-transitory machine-readable storage medium of claim 9, wherein $\mathbb{G}'$ is a set of points $(\vartheta:1:\vartheta^3)$ on a Weierstrass curve.

17. A device for protecting against faults in a computation of a point multiplication $Q=[k]P$ on an elliptic curve E defined over a prime field $\mathbb{F}_p$ for an elliptic curve cryptographic function in a cryptographic system, comprising:
a memory; and
a processor in communication with the memory, the processor configured to:
receive input data;
perform the elliptic curve cryptographic function on the input data wherein the cryptographic function is one of encryption, decryption, digital signatures, secure key exchange, and generation of public certificates and the elliptic curve cryptographic function includes the computation of the point multiplication $Q=[k]P$ on the elliptic curve E, the processor further configured to:
define an integer r and a group $\mathbb{G}'=\{\gamma(\vartheta)\vartheta\in\mathbb{Z}/r\mathbb{Z}\}$ represented with elements having a group law that coincides with a group law used in the representation for $E(\mathbb{F}_p)$ and isomorphic to an additive group $(\mathbb{Z}/r\mathbb{Z})^+$ through isomorphism $\gamma$;

form a combined group $E(\mathbb{F}_p) \times \mathbb{G}' \cong E(\mathbb{F}_p) \times (\mathbb{Z}/r\mathbb{Z})^+$ which is isomorphic to a cross product of the groups $E(\mathbb{F}_p)$ and $(\mathbb{Z}/r\mathbb{Z})^+$;

select an element $\vartheta$ in $\mathbb{Z}/r\mathbb{Z}$ and defining an element $P' = \gamma(\vartheta)$ in group $\mathbb{G}'$;

form a combined element $\hat{P} = CRT(P,P')$ in the group $E(\mathbb{F}_p) \times \mathbb{G}'$;

calculate $\hat{Q} = [k]\hat{P}$ in the combined group $E(\mathbb{F}_p) \times \mathbb{G}'$;

calculate $k\vartheta$ in $\mathbb{Z}/r\mathbb{Z}$; and check whether $\hat{Q} \equiv Q' \pmod{r}$ where $Q' = \gamma(k\vartheta)$ to indicate a fault in a point multiplication in the cryptographic system; and produce an output of the elliptic curve cryptographic function when no fault in the point multiplication is indicated.

18. The device of claim 17, wherein when $\hat{Q} \equiv Q' \pmod{r}$ output $Q = \hat{Q} \bmod p$ and otherwise return an error.

19. The device of claim 17, wherein $\mathbb{G}'$ is a set of points $(\vartheta, 1)$ on a twisted Edwards curve.

20. The device of claim 17, wherein $\mathbb{G}'$ is a set of points $(\vartheta, 1)$ on a Jacobi quartic curve.

21. The device of claim 17, wherein $\mathbb{G}'$ is a set of points $(\vartheta, 1, 1)$ on a Jacobi quadratics intersection curve.

22. The device of claim 17, wherein $\mathbb{G}'$ is a set of points $(\vartheta, -1)$ on a Hessian curve.

23. The device of claim 17, wherein $\mathbb{G}'$ is a set of points $(\vartheta, \bar{c}\vartheta)$ on a Huff curve, where $\bar{c}$ is any value in $\mathbb{Z}/r\mathbb{Z}$.

24. The device of claim 17, wherein $\mathbb{G}'$ is a set of points $(\vartheta : 1 : \vartheta^3)$ on a Weierstrass curve.

* * * * *